United States Patent [19]

Kling

[11] 4,288,222
[45] Sep. 8, 1981

[54] DOLL WITH REMOVABLE ORGANS

[76] Inventor: Jane A. Kling, 818 S. Wolcott, 401 S.R.H., Chicago, Ill. 60622

[21] Appl. No.: 122,892

[22] Filed: Feb. 19, 1980

[51] Int. Cl.³ .............................................. G09B 23/34
[52] U.S. Cl. ........................................ 434/272; 46/22; 46/162
[58] Field of Search ................ 35/17; 434/272; 46/22, 46/162

[56] References Cited

U.S. PATENT DOCUMENTS

| | | | |
|---|---|---|---|
| 2,678,505 | 5/1954 | Munson | 35/17 |
| 3,715,816 | 2/1973 | White | 35/73 |
| 4,197,670 | 4/1980 | Cox | 35/17 X |

OTHER PUBLICATIONS

Stansi Scientific Division, p. 42, Torso Model with Head No. 17145.

"Operation" Game, p. 486 of Sears 1969 Christmas Book.

Primary Examiner—Harland S. Skogquist
Attorney, Agent, or Firm—Sughrue, Mion, Zinn, Macpeak and Seas

[57] ABSTRACT

A rag-type doll is provided with a hollow body cavity accessible by means of a zipper-closed opening located in the front of the doll. A simulated rib cage is located in the upper portion of the body cavity and simulated, stuffed replicas of the major body organs are located within the cavity. The various organs are located in their approximately correct position within the body cavity and secured to the body cavity and/or each other by means of snap fasteners or the like. The organs are completely removable from the body cavity for instructional purposes. A small bone is also removably located in a pocket in one arm for instructional purposes.

2 Claims, 3 Drawing Figures

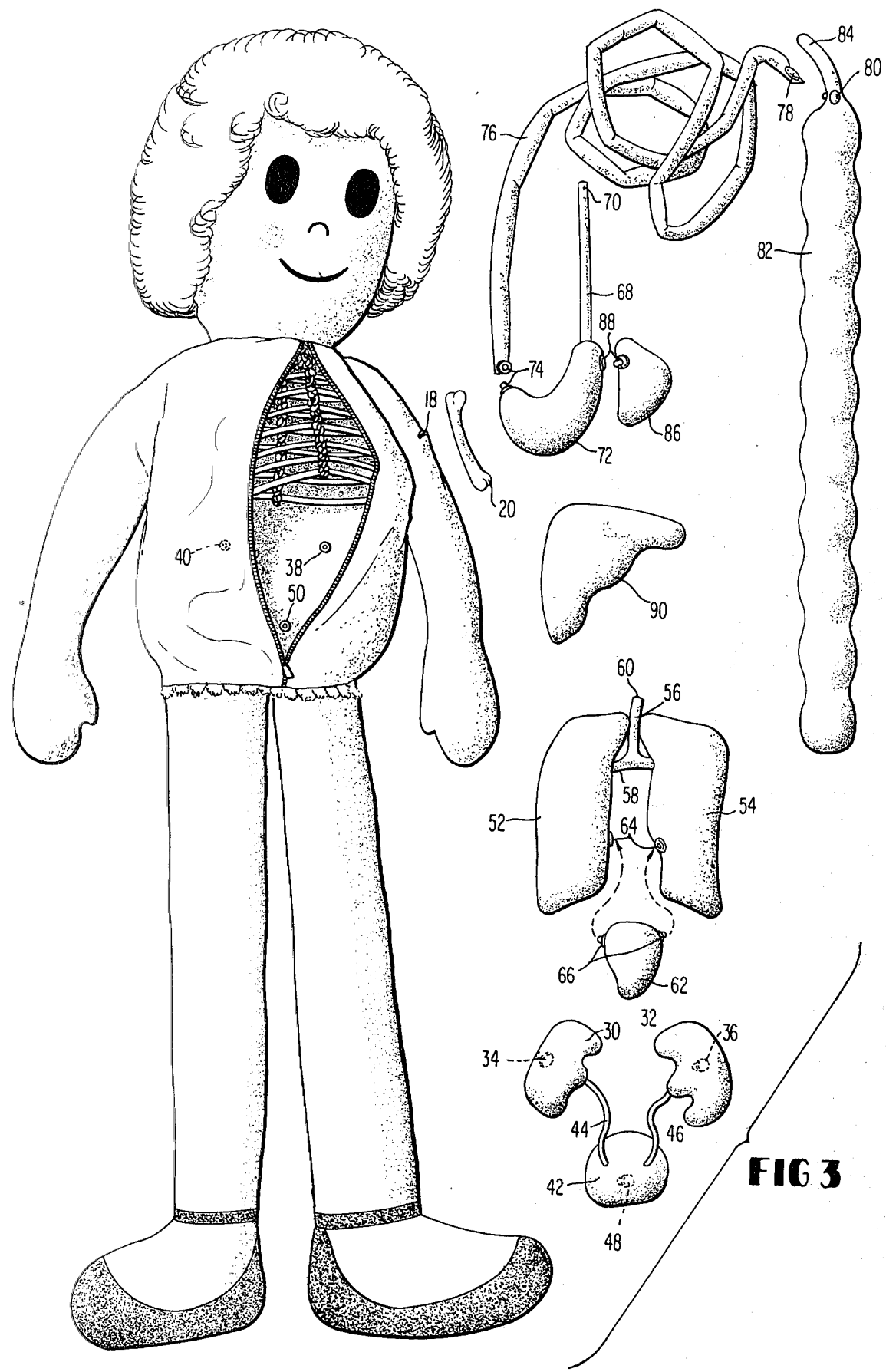

DOLL WITH REMOVABLE ORGANS

BACKGROUND OF THE INVENTION

1. Field of the Invention:

The present invention is directed to an educational doll and more specifically to an educational doll having a removable set of simulated, stuffed body organs.

2. Prior Art:

It is well known in the art to construct dolls with one or more life-like characteristics for entertainment and/or instructional purposes. Dolls are presently available which are capable of talking, burping, wetting, crying, sleeping, walking and various other functions.

Skeletons, both real and artificial, have long been used as educational aids and life-size dummies have been constructed for various research purposes such as automobile crash tests and the like.

SUMMARY OF THE INVENTION

The present invention provides a doll having a hollow body portion accessible through a closeable opening in which a simulated rib cage and a plurality of simulated organs are removably located in their proper perspective. While the doll is completely suitable for play or entertainment purposes, the primary purpose is educational to provide students or patients, especially young children, some knowledge as to the shape and location of the various organs within the human body. Such a tangible visual aid is most helpful in explaining surgical procedures to patients who are about to be operated on and in generally providing people with a better understanding of what the various organs look like and how they are located relative to one another within the body cavity.

The foregoing and other objects, features and advantages of the invention will be apparent from the following more particular description of the preferred embodiment of the invention as illustrated in the accompanying drawings.

BRIEF DESCRIPTION OF THE DRAWINGS

FIG. 3 is an exploded perspective view of the doll with the cavity open and all of the organs and bone removed therefrom and disconnected from each other.

DETAILED DESCRIPTION OF THE INVENTION

Figure 1:
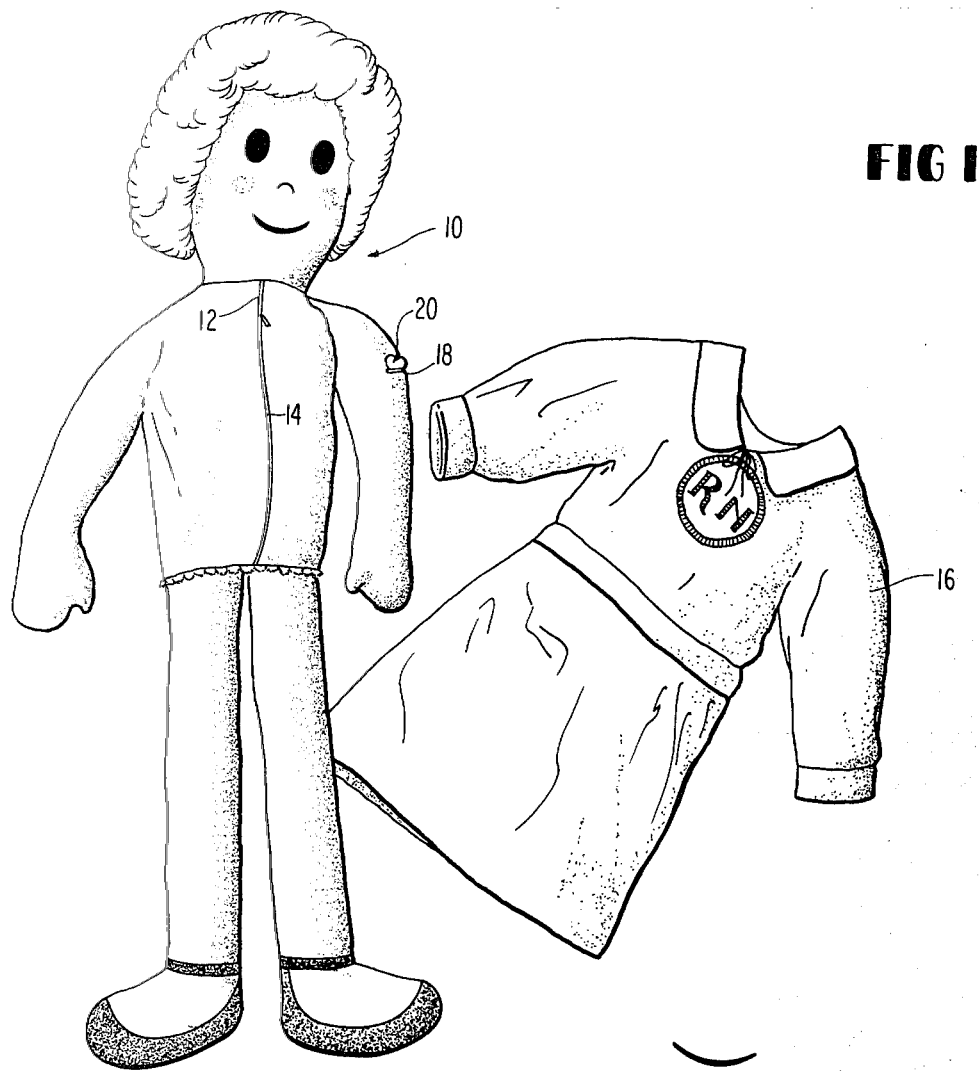
FIG. 1 is an exploded perspective view of the doll according to the present invention with a dress, suitable for the doll, removed therefrom.

The doll, as shown in FIG. 1, is a typical rag-type doll which can readily be bought in stores or made from readily available patterns. The doll 10 may be stuffed with foam material in the head, arms, legs and feet portions thereof, with the body cavity being substantially hollow. The body portion is provided with a vertical opening which extends the entire length of the body from the neck to the crotch area. The opening 12 may be closed by a zipper 14 or any other suitable closure means such as snap fastners, buttons, VELCRO strips or the like. The doll may also be provided with any suitable clothing such as the nurses uniform illustrated in FIG. 1. A pocket 18 is located in one arm of the doll and a bone 20, which may be a real bone such as a chicken bone or a simulated bone of plastic material, is removably located in the pocket. The pocket 18 may be provided with a suitable closure if desired. The primary purpose of the bone is to teach patients, especially young children, what the bones generally look like inside the limbs of a body.

Figure 2:
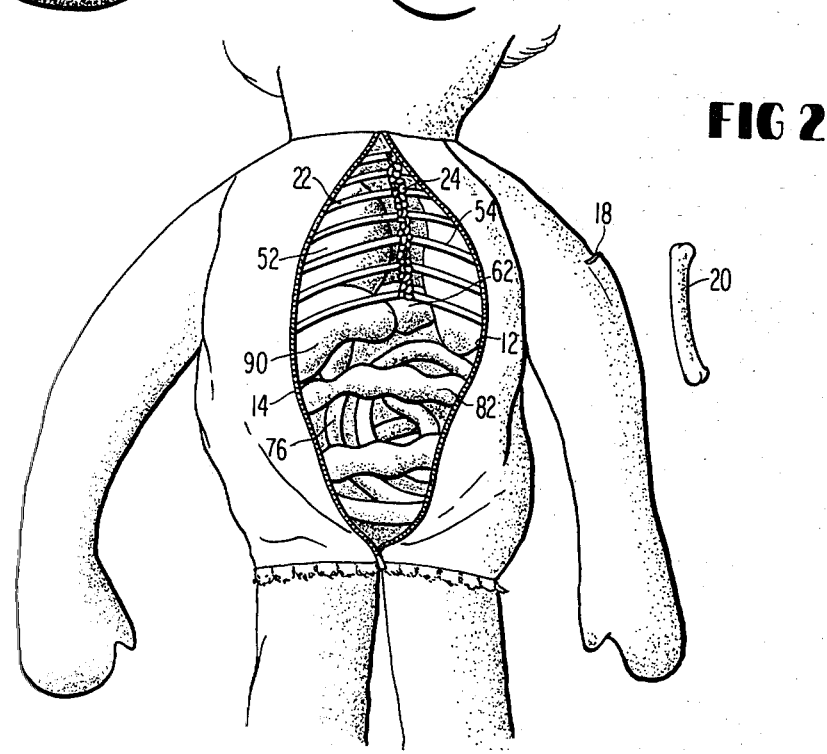
FIG. 2 is a perspective front view of the doll with the body cavity opened to show the simulated rib cage and organs in position within the body cavity and showing the bone removed from the arm pocket.

As best seen in FIGS. 2 and 3, a simulated rib cage 22 is formed from pipe cleaners or any other suitable material by twisting the ends of the pipe cleaners together to form a simulated breast bone 24. The rib cage may be removably located within the breast cavity or may be secured therein by any suitable means. As will be explained hereinafter, it is not necessary to remove the rib cage from the body cavity to remove the various organs and therefore, the rib cage could be made from more realistic materials such as plastics or the like.

The various organs which are shown within the body cavity in FIG. 2 have been removed and separately illustrated in FIG. 3. Each of the organs has a shape resembling the shape of the actual human organ and are made from cloth or any other suitable material, sewn into the desired shape and stuffed appropriately with any suitable filler such as foam material or the like.

A pair of simulated kidneys 30 and 32 are each provided with a snap fastner 34 and 36 respectively. The kidneys may be secured within the body cavity by engaging the snap fastners 34 and 36 with complementary snap fastners 38 and 40 respectively. The two simulated kidneys 30 and 32 are connected to a simulated bladder 42 by means of a pair of tubular cloth strips 44 and 46 which represent the ureters. The ureters may be sewn at the opposite ends thereof to the kidneys and the bladder. The bladder is provided with a snap fastner 48 which is adapted to be detachably connected to a complementary snap fastner 50 within the body cavity.

The simulated lungs 52 and 54 are connected together by means of two tubular cloth strips 56 and 58 which are sewn to each other to form a T-shaped configuration with the tubular strip 56 representing the trachea and the tubular strip 58 representing the two bronchea. The opposite ends of the bronchea may be sewn to the simulated lungs 52 and 54 and the upper end of the trachea 56 is provided with a snap fastner 60 which may be detachably connected to a complementary snap fastner (not shown) secured within the body cavity adjacent the top portion thereof. The simulated heart 62 is adapted to be located between the two lungs 52 and 54 and is detachably secured thereto by means of complementary snap fastners 64 and 66.

The esophagus 68 is simulated by means of a tubular cloth strip which is provided at the upper end thereof with a snap fastner 70 adapted to be detachably connected to a complementary snap fastner (not shown) secured within the body cavity adjacent the upper portion thereof immediately next to the snap fastner for securing the trachea in position. The opposite end of the esophagus is permanently secured by means of stitching or the like to the simulated stomach 72 and the opposite end of the stomach is connected by means of a pair of complementary snap fastners 74 to one end of the simulated small intestine 76 which is constructed as a hollow cloth tube. The opposite end of the small intestine 76 is provided with a snap fastner 78 which is adapted to be connected to the complementary snap fastner 80 secured adjacent one end of the large intestine or colon 82 which also constructed as a hollow tubular cloth member. The large intestine or colon 82 and the small intestine 76 are filled with a suitable stuffing material and the trachea, bronchea and ureters may or may not be filled with a stuffing material. A tab of cloth material extends outwardly on the opposite side of the fastner 80 from the colon 82 and represents the appendix 84. A simulated spleen 86 is detachably connected to the stomach by means of a pair of complementary snap fastners 88. The lower end of the colon 82 may be secured to the back of the body cavity adjacent the lower end thereof by any suitable means or may be left free. It is also possible to provide a simulated urethra which may be detachably connected at one end to the bladder 42 and detachably connected to the bottom portion of the body cavity by any suitable means such as snap fastners or the like. Finally, a simulated liver 90 is provided which may or may not be secured in place to the body cavity or one or more of the adjacent organs.

As mentioned previously, the various organs can all be located within the body cavity as shown in FIG. 2. While not all of the organs are visible in FIG. 2, the lungs 52, 54 the heart 62, the liver 90, the small intestines 76 and the colon 82 are all shown in their proper relative positions. The various organs may be readily removed for explanatory purposes. For example, if a child is about to undergo an appendectomy, the large intestine 82 and the small intestine 76 could be removed from the body cavity either completely or partially to expose the appendix 84. The nurse or doctor could then show the child how the appendix would be removed by cutting it off with a scissors. It is also contemplated that the appendix 84 could be detachably secured to the end of the colon 82 by means of snap fastners or the like so that it would only be necessary for the doctor to unsnap the appendix for purposes of demonstration.

The various organs and the rib cage may be made from any suitable materials and the organs may be constructed from different colored materials to help distinguish them from each other. It is obvious that various types of fastners could be utilized in lieu of snap fastners, for example, VELCRO fastners could be provided for securing the various organs to each other and to the wall of the body cavity.

While the invention has been particularly shown and described with reference to a preferred embodiment thereof, it will be understood by those in the art that various changes in form and details may be made therein without departing from the spirit and scope of the invention.

What is claimed is:

1. A doll comprising a soft, pliable hollow body portion, a head, arms and legs secured to said doll, a closeable aperture in said body portion for providing access to the interior thereof, a simulated rib cage constructed from elongated malleable elements interconnected with each other located within said hollow body portion, a plurality of soft, pliable simulated body organs detachably connected to each other and the interior of said hollow body portion in the proper location relative to each other including a heart, lungs, a stomach, a spline, a liver, kidneys, and a bladder, said kidneys being connected to said bladder by simulated ureter tubes of cloth material with said kidneys and bladder being detachably connected to the wall of said hollow body portion, said heart being detachably connected to said lungs and said lungs being connected to each other by simulated bronchea tubes of cloth material which in turn are connected to a simulated trachea tube of cloth material detachably connected to the interior of said hollow body portion, and said spleen being detachably connected to said stomach which in turn is detachably connected to the interior of said hollow body portion through a simulated esophagus tube of cloth material and further comprising a simulated small intestinal tube of flexible cloth material detachably connected at one end to said stomach and a simulated colon of flexible cloth material being detachably connected at one end to the other end of said small intestinal tube.

2. A doll as set forth in claim 1 further comprising a simulated appendix of cloth material connected to and projecting from said colon adjacent the connection of said colon to said small intestine whereby said appendix may be cut off to simulate an appendectomy.

* * * * *